(12) United States Patent
Morgan et al.

(10) Patent No.: US 6,384,824 B1
(45) Date of Patent: May 7, 2002

(54) METHOD, SYSTEM AND COMPUTER PROGRAM PRODUCT FOR MULTI-PASS BUMP-MAPPING INTO AN ENVIRONMENT MAP

(75) Inventors: David L. Morgan, Mountain View; Mark S. Peercy, Sunnyvale, both of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/377,778

(22) Filed: Aug. 20, 1999

Related U.S. Application Data

(60) Provisional application No. 60/142,547, filed on Jul. 7, 1999.

(51) Int. Cl.$^7$ .............................................. G06T 15/60
(52) U.S. Cl. ...................................................... 345/426
(58) Field of Search ................................ 345/426, 582, 345/584

(56) References Cited

U.S. PATENT DOCUMENTS 5,880,736 A     3/1999   Peercy et al. ................ 345/426

OTHER PUBLICATIONS

Woo, M. et al., *OpenGL Programming Guide, The Official Guide to Learning OpenGL, Version 1.1*, Second Edition, Addison–Wesley Publishing, Copyright 1997.
OpenGL Architecture Review Board, *OpenGL Reference Manual: The Official Reference Document for OpenGL, Release 1*, Addision–Wesley Publishing, Copyright 1992.
Blinn, James F., "Simulation of Wrinkled Surfaces," Computer Graphics (SIGGRAPH '78 Proceedings), vol. 12, Aug. 1978, pp. 286–292.
Cosman, Michael A. and Grange, Robert L., "CIG Scene Realism: The World Tomorrow," 1996, from °http://ft-p.es.com/Products/Sim/harmony/cosman_grange/cosman_grange.html<, 18 pages.

(List continued on next page.)

*Primary Examiner*—Mark Zimmerman
*Assistant Examiner*—Lance W. Sealey
(74) *Attorney, Agent, or Firm*—Woodcock Washburn LLP

(57) ABSTRACT

A method, system, and computer program product are provided for multi-pass bump-mapping into an environment map. At least two passes are made through a hardware rasterizer to bump map into an environment map. In the first pass, a lighting equation is overloaded. The overloaded lighting equation represents a reflection vector of a perturbed normal at a pixel position. The reflection vector at a pixel position is then generated according to the overloaded lighting equation. In a second pass, at least one texel in an environment map is accessed based on the generated reflection vector. For example, the generated reflection vector can be used as a look-up into the environment map to access one or more texel samples. In one example implementation, a lighting equation includes a specular material vector Sm, a lighting vector L, and an ambient material vector Am. Such a lighting equation is overloaded by setting the specular material vector Sm to equal a perturbed normal vector N', setting the lighting vector L to equal a viewing vector V at the pixel position, and setting an ambient material vector Am to equal the viewing vector V. Other terms in the lighting equation include a specular exponent n two vectors scli and acli. To overload the lighting equation, the specular component n is set to equal one, the vector scli is set to equal to {2,2,2}; and the vector acli is set to equal to {−1,−1,−1}. A single hardware rasterizer can be used. A separate reflection vector calculation is avoided. One hardware rasterizer can be used to perform processing in each pass. Two separate texture fetch units to support a reflection vector calculation are not necessarily needed.

17 Claims, 8 Drawing Sheets

OTHER PUBLICATIONS

Ernst, I. et al., "Hardware–Supported Bump Mapping," *Computers & Graphics*, vol. 20, No. 4, 1996, pp. 515–521.

Foley, James D. et al., *Computer Graphics: Principles and Practice*, Second Edition, Addison–Wesley Publishing, Copyright 1990, pp. xvii–xxiii and 855–922.

Fosner, R., *OpenGL: Programming for Windows 95 and Windows NT*, Addison–Wesley Publishing, Copyright 1997, pp. vii–xi and 181–201.

Phong, Bui T., "Illumination for Computer Generated Pictures," *Communications of the ACM*, vol. 18, No. 6, Jun. 1975, pp. 311–317.

Voorhees, D. and Foran, J., "Reflection Vector Shading Hardware," Computer Graphics Proceedings, Annual Conference Series, 1994, pp. 163–166.

N=Normal, V=View, R=Reflected

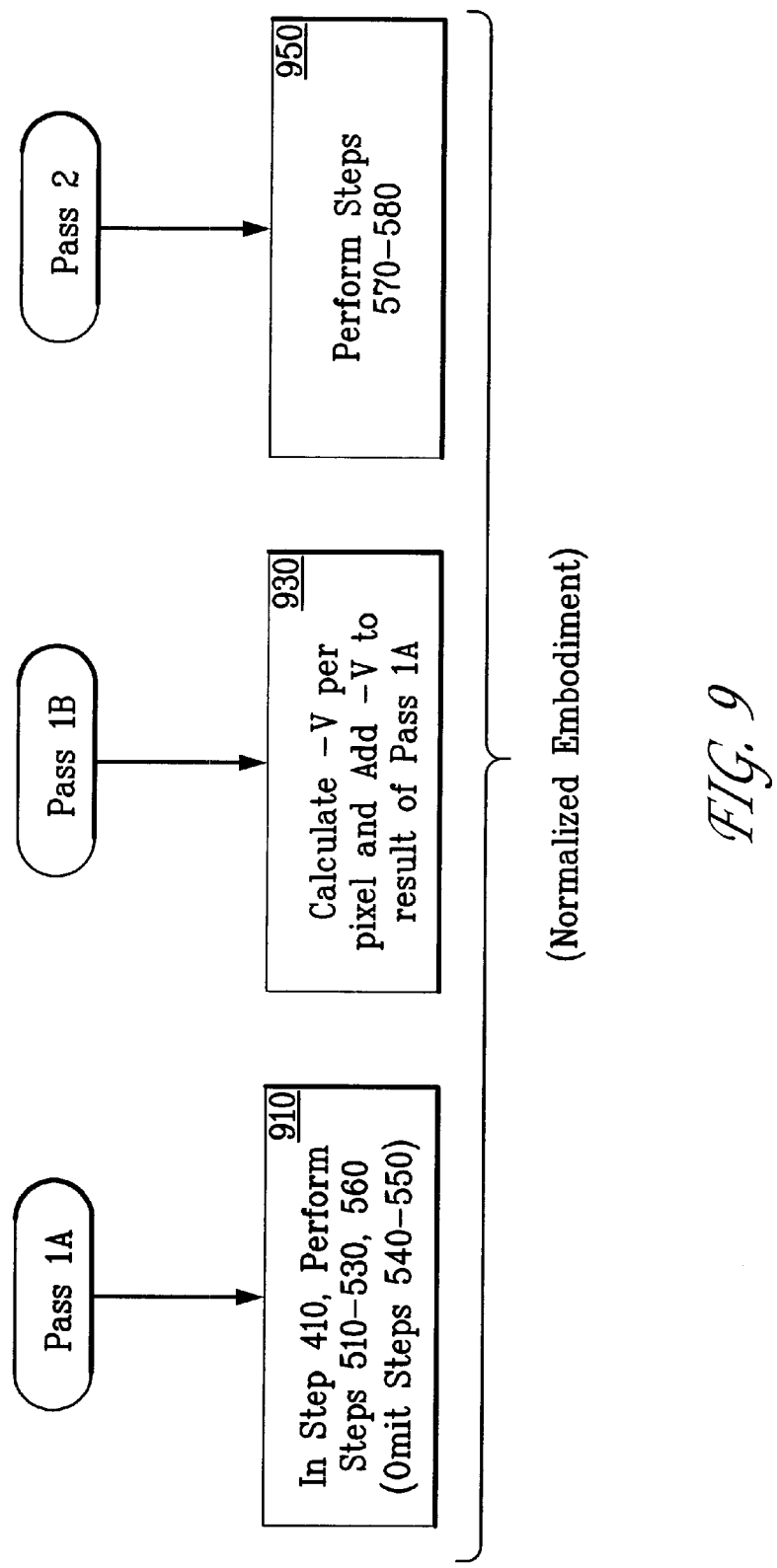
FIG. 9 (Normalized Embodiment)

METHOD, SYSTEM AND COMPUTER PROGRAM PRODUCT FOR MULTI-PASS BUMP-MAPPING INTO AN ENVIRONMENT MAP

The present application claims the benefit of priority to U.S. Provisional Patent Application No. 60/142,547, filed Jul. 7, 1999, now pending, which is incorporated by reference herein in its entirety.

BACKGROUND OF THE INVENTION

1. Field of the Invention

The present invention relates generally to shading computer-generated images.

2. Related Art

A. Light Equation Calculations in Shading

In computer graphics, shading is an important component that contributes to the realism of a geometric scene to be rendered. The calculations associated with shading can be split into two parts: finding surface reflectance properties at each point being shaded, and computing the incident illumination at the point being shaded. Surface reflectance properties are used by computer graphics application programming interfaces (graphics APIs) to define how a surface dissipates light. For example, one graphics API, OpenGL® by Silicon Graphics, Inc., supports five surface reflectance properties: diffuse and ambient properties, specular and shininess properties, and an emissive property. See, e.g. R. Fosner, *OpenGL® Programming for Windows 95 and Windows NT* (Addison-Wesley Pub.: Reading, Mass. 1997), Chapter 9, "Colors, Materials, and Lights," pp. 181–201. Computing the incident illumination takes into account the angle of an illumination source relative to an object surface. Lighting, half angle, and/or viewing vectors (L, H, V) are used to compute incident illumination.

These shading calculations are combined in a lighting equation to determine a color value for a respective pixel. The lighting equation can vary depending upon the particular illumination model or graphics effect that is desired. One example lighting equation used by the OpenGL® API determines a color value $C_s$ as follows:

$$C_S = E_m + A_m * A_s + \left( \sum_{i=0}^{k-1} A_{tt} * SpotL(A_m * A_l + D_m * D_l * (L \cdot N) + S_m * S_l * (H \cdot N)^n) \right) + S_m * Env$$

wherein, $E_m$ represents emissivity, $A_m$ is a material ambient coefficient, $A_s$ is a scene ambient coefficient, $A_l$ is an ambient light color, $A_{tt}$ is an attenuation factor, SpotL is a spotlight attenuation factor, $D_m$ is a diffuse material coefficient, $D_l$ is diffuse light color, $S_m$ is a specular material coefficient, $S_l$ is specular light color, n is the specular power (e.g., shininess), and Env is an environment mapping coefficient. The summation sign sums overall lights k, and like other terms in the lighting equation can be omitted depending upon a particular illumination model. L and H are the lighting and half angle vectors, respectively. See, Beider et al., *OpenGL® Programming Guide*, Silicon Graphics, Inc. (Addison-Wesley Publishing Co., 1993), pp. 182–194 (incorporated herein by reference).

B. Phong Shading

Shading quality is increased dramatically with Phong shading, which interpolates and normalizes vertex normal vectors at each pixel. See, Phong, B.-T., "Illumination For Computer Generated Pictures", *Communications of the ACM* 18 6:311–317 (June 1975). In Phong shaders, light and halfangle vectors are computed directly in world space or interpolated, either of which requires their normalization relative to a local viewer and light. FIG. 1A shows a lighting vector L, half-angle vector H, normal vector N, and viewing vector V relative to an example object surface, such as, a sphere. These vectors are passed to a Phong shader. FIG. 1B shows rasterization hardware 100 for one example implementation of Phong shading. This hardware includes three sets of interpolator and normalizer units 110, 120, 130 coupled in parallel to an illumination module 150. The sets of interpolator and normalizer units interpolate and normalize respective normal, lighting, and half-angle vectors (N, L, and H). Interpolated and normalized normal, lighting, and half-angle vectors are then passed to illumination module 150 to be used in further lighting and shading calculations.

Phong shading adds cost to rasterization hardware. However, higher quality lighting is almost universally desired in three-dimensional graphics applications, and advancing semiconductor technology is making Phong shading hardware more practical to many users and vendors.

C. Bump Mapping

Bump mapping is a technique used in advanced shading applications for simulating the effect of light reflecting from small perturbations across a surface. See, Blinn, J. F., "Simulation of Wrinkled Surfaces", *Computer Graphics* (*SIGGRAPH '78 Proceedings*) vol. 12, (Aug. 1978), pp. 286–292. A single component texture map, f(u,v), is interpreted as a height field that perturbs the surface along its normal vector, $N=(P_u \times P_v)/|(P_u \times P_v)|$, at each point. Rather than actually changing the surface geometry, however, only the normal vector is modified. FIG. 2 shows an example of a normal vector N, a perturbation $\Delta N$, and the resultant vector N'.

From the partial derivatives of the surface position in the u and v parametric directions ($P_u$ and $P_v$), and the partial derivatives of the image height field in u and v ($f_u$ and $f_v$), a perturbed normal vector N' is given by:

$$N'=((P_u \times P_v)+D)/|(P_u \times P_v)+D| \qquad (1)$$

where, a displacement vector D becomes:

$$D=-f_u(P_v \times N)-f_v(N \times P_u) \qquad (2)$$

In these equations, $P_u$ and $P_v$ are not normalized. This causes the bump heights to be a function of the surface scale because $P_u \times P_v$ changes at a different rate than D. If the surface scale is doubled, the bump heights are halved. This dependence on the surface often is an undesirable feature and a constant bump height is forced instead. See, Blinn, J. F., "Simulation of Wrinkled Surfaces", *Computer Graphics* (*SIGGRAPH '78 Proceedings*), vol. 12, (Aug. 1978), pp. 286–292.

A full implementation of these equations in a rasterizer can be impractical, so the computation is divided among a preprocessing step, per-vertex, and per-pixel calculations. An expensive method to implement bump mapping in hardware, and one that is planned for a high-end graphics workstation, is to compute $P_u \times P_v$, $P_v \times N$, and $N \times P_u$ at polygon vertices and interpolate them to polygon interiors. See, Cosman, M. A. & Grange, R. L., "CIG Scene Realism: The World Tomorrow", *Proceedings of I/ITSEC* 1996 on CD-ROM, (1996), p. 628. The perturbed normal vector is computed and normalized as in Equation 1, with $f_u$ and $f_v$ read from a texture map. The resulting normal vector is used in an illumination model. One approximation to this expensive implementation has been proposed, where $P_v \times N$ and $N \times P_u$ are held constant across a polygon. See, Ernst, I., et al., "Hardware Supported Bump Mapping: A Step Towards Higher Quality Real-Time Rendering", 10*th Eurographics Workshop on Graphics Hardware* (1995), pp. 63–70. This approximation is known to have artifacts.

A further technique provides high-quality, accelerated shading by bump mapping in a coordinate space, such as, atangent space or object space. See, U.S. Pat. No. 5,880,736, issued to Peercy et al., on Mar. 9, 1999 (incorporated in its entirety herein by reference). Among other things, this technique implements bump mapping by leveraging Phong shading hardware at full speed, eliminating either a large investment in special purpose hardware or a slowdown during bump mapping.

In general, as described below, the present invention is not limited to a particular bump-mapping algorithm and can be used in any graphics system that supports bump-mapping.

D. Environment Mapping

An environment map is a 360 degree image of an environment as viewed from a single reference point. Environment maps are used to model a scene at an infinite distance from a reference point. They are an arbitrary function of direction alone, and ignore parallax. Examples of environment maps include spheric or circular environment maps and cubic environment maps.

A reflection vector R is used to index an environment map. FIG. 3 shows an object surface with respective normal, lighting and reflection vectors N, V, R. One common calculation for R is:

$$R = 2 * \hat{N} * (\hat{N} \cdot \hat{V}) - \hat{V},$$

where $\hat{N}$ denotes a normalized normal vector N and $\hat{V}$ denotes a normalized viewing vector V. Texture mapping hardware is used to map texels in an environment map to an object. See, e.g., the software and hardware renderers using cubic and circular environment maps described by Voorhies and Foran, "Reflection Vector Shading Hardware," *SIGGRAPH '94, Computer Graphics Proceedings, Annual Conference Series*, 1994, pp. 163–66 (incorporated in its entirety herein by reference).

E. Problem of Combining Bump Mapping and Environment Mapping Efficiently

A problem arises when an object is rendered with both bump mapping and environment mapping. This problem results from different geometric representations that underpin bump-mapping and environment mapping. Different types of texture maps are used to carry-out bump-mapping. A "bump-map" is a texture representing a pattern of perturbations. This bump-map is used to perturb a surface normal using a fragment's interpolated tangent and binormal vectors. A "normal map" is a texture representing a pattern of perturbed normals. Entries from the normal map are substituted entirely for the surface normals of fragments.

Since bump-mapping using a bump-map affects a Phong lighting equation or calculation by perturbing surface normals across polygons of an object, applying an environment map to a bump-mapped object is incorrect geometrically. For a normal or bump map to be used in a geometrically correct manner with an environment map, it must perturb a reflected ray used to look-up an environment map. This requires a reflector vector calculation in between bump-mapping and environment mapping. Such a reflection vector calculation is expensive in hardware. Two separate texture fetch units to carry out the bump-mapping and environment mapping would also be required.

What is needed is an inexpensive method, system, and computer program product that combines bump-mapping and environment mapping. A separate reflection vector calculation needs to be avoided. The requirement of two separate texture fetch units to carry out the bump-mapping and environment mapping also needs to be overcome.

SUMMARY OF THE INVENTION

The present invention provides a method, system, and computer program product for bump-mapping into an environment map in multiple passes. A single hardware rasterizer can be used. A separate reflection vector calculation is avoided. One hardware rasterizer can be used to perform processing in each pass. Two separate texture fetch units to support a reflection vector calculation are not necessarily needed.

In one embodiment, at least two passes are made through a hardware rasterizer to bump map into an environment map. In the first pass, a lighting equation is overloaded. The overloaded lighting equation represents a reflection vector of a perturbed normal at a pixel position. The reflection vector at a pixel position is then generated according to the overloaded lighting equation. In a second pass, at least one texel in an environment map is accessed based on the generated reflection vector. For example, the generated reflection vector can be used as a look-up into the environment map to access one or more texel samples. In this way, bump mapping and environment mapping effects can be applied in shading on a per-pixel basis in multiple passes through a rasterizer.

According to the present invention, terms in a lighting equation are overloaded to equal a reflection vector R calculated as follows:

$$R = 2N'(N' \cdot V) - V,$$

where N' is a perturbed normal, and V is a viewing vector at the pixel position.

In one example implementation, a lighting equation includes a specular material vector Sm, a lighting vector L, and an ambient material vector Am. Such a lighting equation is overloaded according to the present invention by setting the specular material vector Sm to equal a perturbed normal vector N', setting the lighting vector L to equal a viewing vector V at the pixel position, and setting an ambient material vector Am to equal the viewing vector V. Other terms in the lighting equation include a specular exponent n and two vectors $s_{cli}$ and $a_{cli}$. To overload the lighting equation, the specular component n is set to equal one, the vector $s_{cli}$ is set to equal to $\{2,2,2\}$; and the vector $a_{cli}$ is set to equal to $\{-1,-1,-1\}$.

In one preferred example, hardware is used to calculate the overloaded lighting equation and thereby, generate a reflection vector. This hardware can include Phong shading hardware.

In one embodiment, the first and second passes are made through the same graphics pipeline that includes a single hardware rasterizer. The first pass carries out the steps of overloading the lighting equation and generating a reflection vector from the overloaded lighting equation. In the second pass, at least one texel is accessed from an environment map based on the reflection vector generated during the first pass. The environment map can include, but is not limited to, a spheric or cubic environment map.

In another embodiment, an additional pass is used to compute an even more geometrically correct reflection vector by passing the reflection vector through a normal subsystem to be interpolated and normalized prior to the texel accessing pass. In this additional pass, the geometry is re-drawn with a normal pointing away. In the first pass, a normal component is set to zero by setting coefficient $a_{cli}$ equal to zero.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 9 is a flowchart of an example implementation for a normalized case.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Figure 1A:
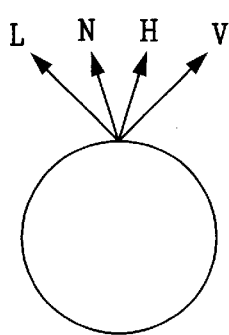
FIG. 1A is a diagram of a lighting vector L, half-angle vector H, normal vector N, and viewing vector V drawn relative to an example object surface (a sphere).
Figure 2:
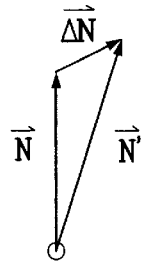
FIG. 2 shows an example of a normal vector N, a perturbation ΔN, and the resultant vector N'.
Figure 3:
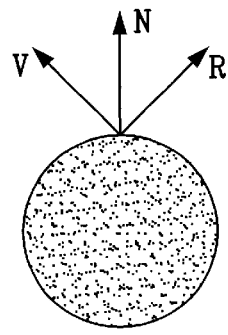
FIG. 3 shows an object surface with respective normal, lighting and reflection vectors N, V, R.
Figure 1B:
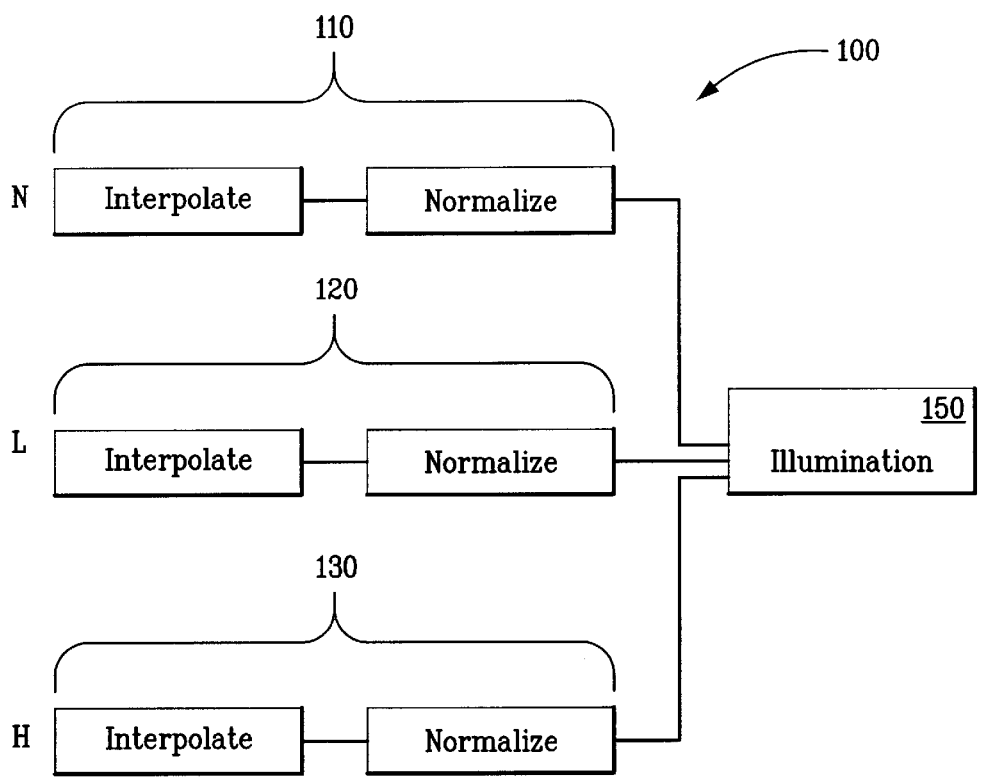
FIG. 1B is a diagram of example Phong shading hardware.

1. Overview and Terminology
2. Example Environment
3. A Multi-Pass Method for Bump-Mapping into an Environment Map
   A. Unnormalized Case
   B. Example Graphics Pipelines
   C. Example GUI Computer Environment
   D. Normalized Case
4. Conclusion

1. Overview and Terminology

The present invention provides a method, system, and computer program product for bump-mapping into an environment map in multiple passes. A single hardware rasterizer can be used. A separate reflection vector calculation is avoided. One hardware rasterizer can be used to perform processing in each pass. Two separate texture fetch units to support a reflection vector calculation are not necessarily needed. This advantage, of course, is not intended to limit the present invention, as two or more texture fetch units could be used depending upon particular user needs or available resources.

The term "lighting equation" is used to refer to any model or lighting equation that describes factors for determining a surface's color and which can be overloaded to represent a reflection vector as described herein.

The term "reflection vector" includes, but is not limited to, a vector or other data used to index or address an environment map.

2. Example Environment

The present invention is described in terms of an example computer graphics processing environments. An example graphics pipeline that can carry out the present invention is described in further detail with respect to FIG. 6. An example graphics pipeline supporting an OpenGL® graphics application programming interface is also described in further detail with respect to FIG. 7.

These example environments are illustrative and not necessarily intended to limit the present invention. Indeed, given the description herein, it would be obvious to one skilled in the art to implement the present invention in any computer graphics system including, but not limited to, a computer graphics processor (single chip or multiple chips), high-end to low-end graphics workstations, gaming platforms, systems and consoles, network architectures (e.g., client/server, local, intermediate or wide area networks), virtual machine (e.g., a Java-created application); and any computer graphics architecture including, but not limited to, an architecture that supports a graphics application programming language, such as, OpenGL®. For example, a computer graphics system can include, but is not limited to, Indigo2™, Indy®, Onyx®, Onyx2™, Infinite Reality®, Infinite Reality2™, or O2® graphics workstations manufactured by Silicon Graphics, Inc. and raster graphics architectures, such as, those described in Foley et al., *Computer Graphics and Principles, chapter* 18, pp. 855–922 (incorporated herein by reference).

Description in these terms is provided for convenience only. It is not intended that the invention be limited to application in this example environment. In fact, after reading the following description, it will become apparent to a person skilled in the relevant art how to implement the invention in alternative environments.

3. A Multi-Pass Method for Bump-Mapping into an Environment Map

A. Unnormalized Case

Figure 4:
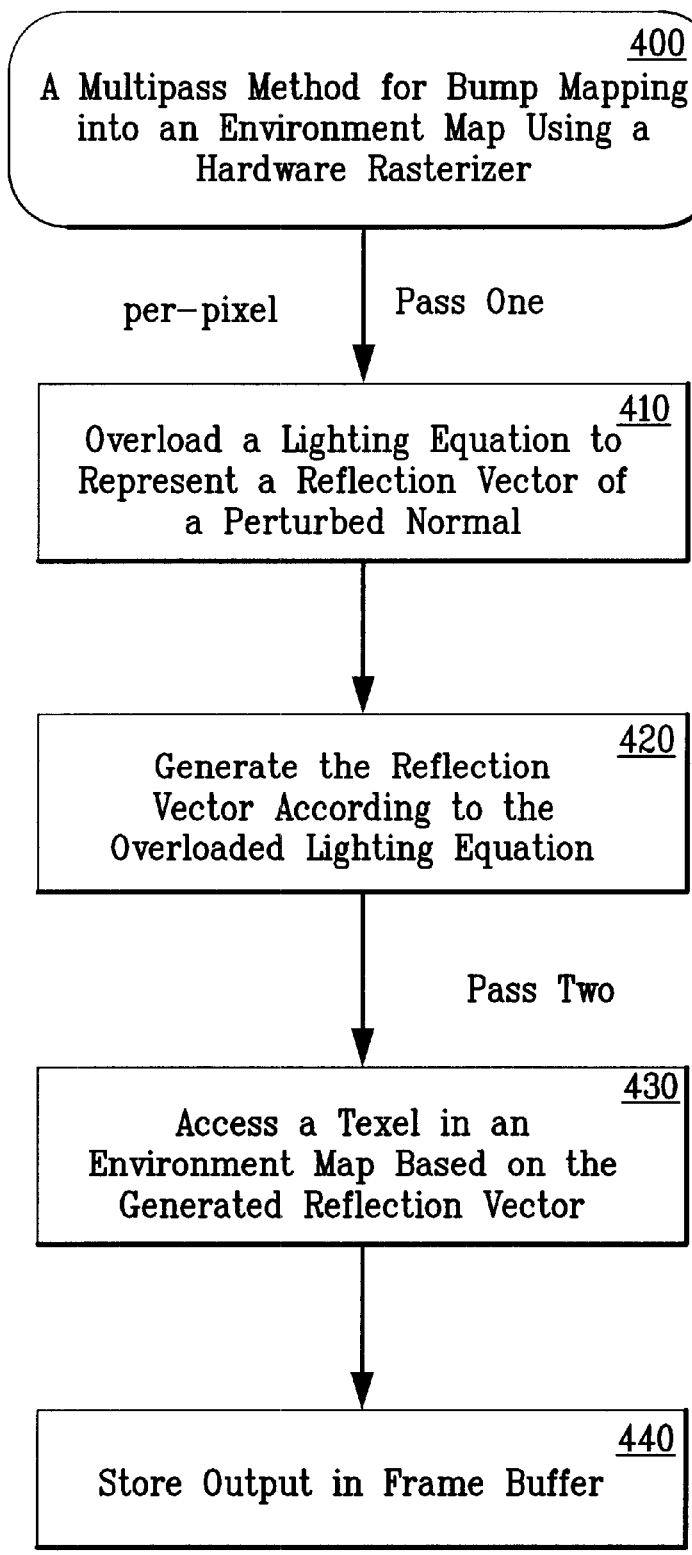
FIG. 4 is a flowchart of a routine for bump mapping into an environment map in multiple passes according to one embodiment of the present invention.
Figure 5A:
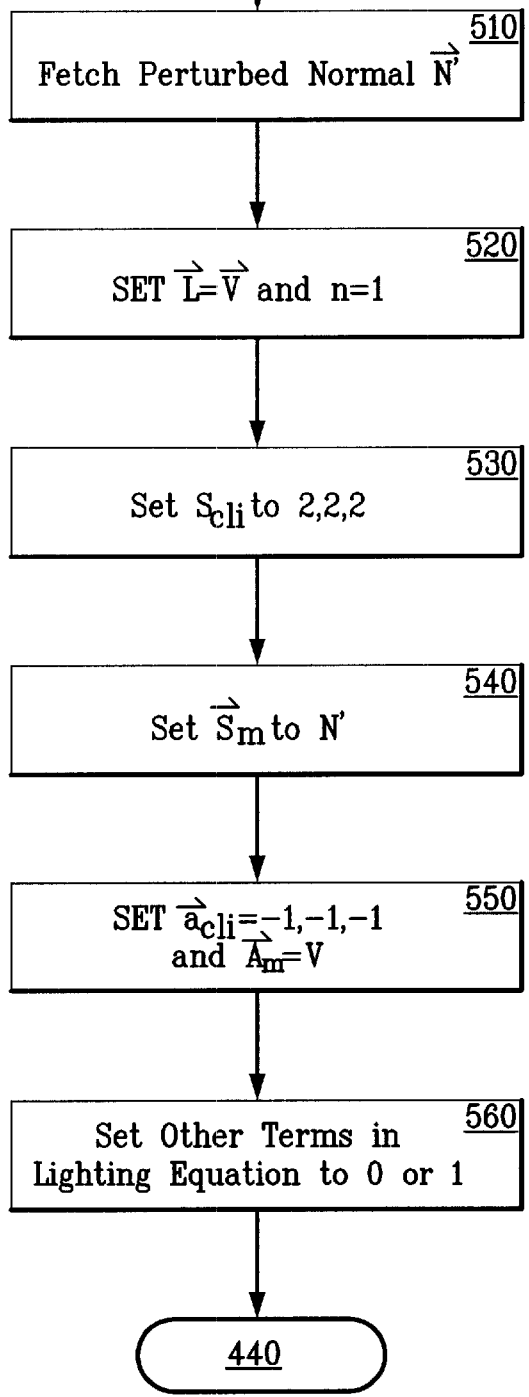
FIGS. 5A and 5B are a flowchart of an example implementation of steps 410 and 430 in FIG. 4 for an unnormalized case.
Figure 5B:
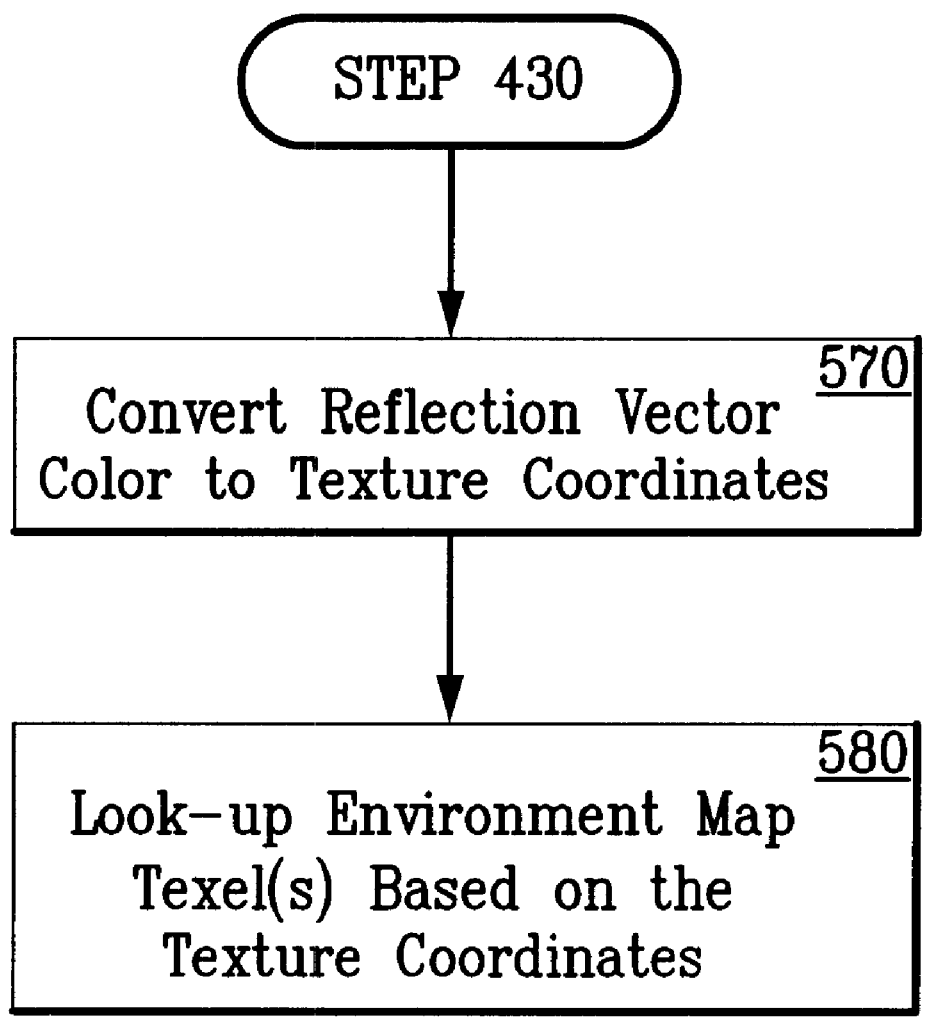

One embodiment of the present invention is described with respect to the flowcharts of FIGS. 4, 5A, and 5B. FIG. 4 shows a multi-pass method 400 for bump-mapping into an environment map using a hardware rasterizer. Two passes are made. The first pass (denoted Pass One) includes steps 410 and 420. The second pass (denoted Pass Two) includes steps 430 and 440.

In step 410, a lighting equation is overloaded. The overloaded lighting equation represents a reflection vector as a function of a perturbed normal at a pixel position. The reflection vector at a pixel position is then generated according to the overloaded lighting equation (step 420). In the second pass, at least one texel in an environment map is accessed based on the generated reflection vector (step 430). For example, the generated reflection vector can be used as a look-up into the environment map to access one or more texel samples. In this way, bump mapping and environment mapping effects can be applied in shading on a per-pixel basis in multiple passes through a rasterizer. The resulting image is then stored in a frame buffer for output display (step 440). The resulting image represents the underlying geometry with a bumpy surface in a particular environment.

According to the present invention, terms in a lighting equation are overloaded in step 410 to equal a reflection vector R calculated as follows:

$$R = 2N'(N' \cdot V) - V,$$

where N' is a perturbed normal, and V is a viewing vector at the pixel position. FIG. 5A shows the operation of overloading a lighting equation (step 410) according to one example implementation of the present invention (steps 510–570). In this example, a lighting equation is used which includes at the following terms to determine a lighting color value Lc as follows:

$$L_C = E_m + A_m * A_s +$$
$$\left( \sum_{i=0}^{k-1} A_{tt} * SpotL(A_m * A_{cli} + D_m * D_{cli} * (N \cdot L) + S_m * S_{cli} * (N \cdot H)^n) \right) +$$
$$S_m * Env$$

wherein, $E_m$ represents emissivity, $A_m$ is a material ambient color coefficient, $A_s$ is a scene ambient coefficient, $A_{cli}$ is an ambient light color, $A_{tt}$ is an attenuation factor, SpotL is a spotlight attenuation factor, $D_m$ is a diffuse material coefficient, $D_{cli}$ is diffuse light color, $S_m$ is a specular material coefficient, $S_{cli}$ is specular light color, n is the specular power (e.g., shininess), N is a normal vector, L is a lighting vector, H is a half-angle vector, and Env is an environment mapping color coefficient. The summation sign sums overall lights k, and like other terms in the lighting equation can be omitted depending upon a particular illumination model.

In one example implementation, terms in the above lighting equation are overloaded in step 410 to equal a reflection vector R calculated as follows:

$$R = 2N'(N' \cdot V) - V,$$

where N' is a perturbed normal, and V is a viewing vector at the pixel position. Each of the vectors N' and V can be unnormalized or normalized according to the present invention. In particular, the terms in the lighting equation are "overloaded" by replacing these terms with information that will equal reflection vector R.

As shown in FIG. 5A, first perturbed normal N' is fetched (step 510). "Fetching" as used herein refers to any way of obtaining a perturbed normal N'. This can include fetching from a pre-computed bump or normal map of perturbed normals, or calculating a perturbed normal N' on the fly. The terms in the lighting equation can then be set to the following information to represent a reflection vector R. Set lighting vector L equal to viewing vector V and set specular exponent n equal to 1 (step 520). Set $s_{cli}$ vector equal to {2,2,2} (step 530). Set Sm equal to the perturbed normal fetched in step 510. Set $a_{cli}$ vector equal to {−1, −1, −1} and the ambient material vector Am to equal the viewing vector V (step 550). Other terms, if any, in the lighting equation (not shown) are also set to 0 or 1 (step 560) so that the output value Lc of the overloaded lighting equation equals a reflection vector R.

After the lighting equation is overloaded in step 410, the graphics pipeline need only evaluate the overloaded lighting equation in step 420 to obtain an output value Rc (called a reflection vector color) from the overloaded lighting equation that equals a reflection vector R at the perturbed normal. This computation can be performed in hardware, such as, conventional Phong shading hardware.

FIG. 5B shows the operation of accessing at least one texel (step 430) according to one example implementation of the present invention (steps 570–580). Steps 570 and 580 can be carried on a second pass through a graphics pipeline (i.e., through a rasterizer). The reflection vector color Rc calculated in pass one, is first converted to texture coordinates (step 570). In one preferred example, not intended to limit the present invention, an OpenGL® command glCopy-Pixels can be used to recirculate a reflection vector field into texture coordinates used to address a cube-environment map.

These texture coordinates are used to look-up at least one texel in an environment map (step 580). The same texture coordinates can be used to access one or more texels depending upon the type of sampling and filtering used. The resulting image is then stored in the frame buffer for output display, and represents the underlying geometry with a bumpy surface in a particular environment.

Note prior to pass two, the graphics pipeline (including the hardware rasterizer) is set-up and enabled for environment mapping and pixel texture. Any type of environment map can be used that is addressable by a per-pixel reflection vector field, including but not limited to, a cubic or spheric environment map.

B. Example Graphics Pipelines

Examples of a graphics processing environment and graphics subsystem architecture providing multi-pass bump mapping into an environment map according to the present invention are described below with respect to FIGS. 6 to 8. An example computer graphics system having a graphics engine subsystem is described with respect to FIG. 8.

Figure 6:
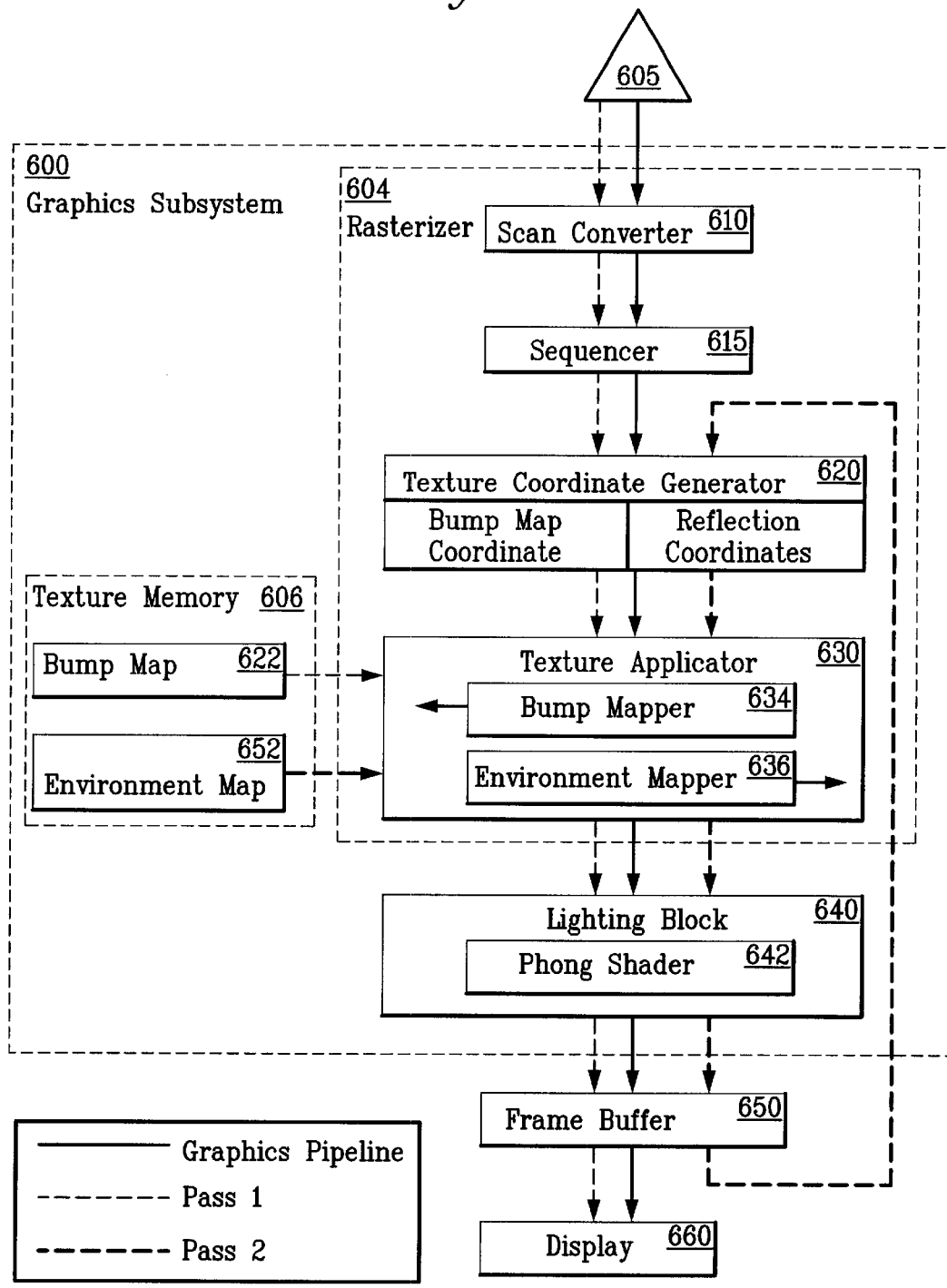
FIG. 6 is a block diagram of an example graphics processing pipeline for bump mapping into an environment map according to the present invention.

FIG. 6 shows an example graphic subsystem 600 according to an embodiment of the present invention. Graphic subsystem 600 includes rasterizer 604, texture memory 606, and lighting block 640. Rasterizer 604 includes scan converter 610, sequencer 615, texture coordinate generator 620, and texture applicator 630. Texture applicator 630 includes bump mapper 634 and environmental mapper 636. Texture memory 606 includes a perturbed normal bump map 622 and an environment map 652. Lighting block 640 includes Phong shader 642.

Graphic subsystem 600 receives geometry data 605 (e.g., primitives, such as, a triangle or polygon). Graphic subsystem 600 processes the geometry data 605 and outputs pixel data into frame buffer 650 for display on a display unit 660. In one preferred implementation, graphic subsystem 600 is a graphics pipeline.

FIG. 6 further shows the operational flow for a pass 1, indicated by a short-dashed line, and pass 2, indicated by a longer-dash line. Pass 1 corresponds to an example implementation of steps 410 and 420 described above with respect to FIG. 4 and FIG. 5A. Pass 2 corresponds to an example implementation of step 430 described above with respect to FIG. 4 and FIG. 5B.

In pass 1, scan converter 610 scan-converts polygonal per-vertex geometry data to fragments. Sequencer 615 passes each fragment to texture coordinate generator 620. Texture coordinate generator 620 generates bump map coordinates based on the vertex information provided in the fragments. Texture applicator 630 uses the generated bump map coordinates to fetch a perturbed normal from bump map 622. Bump mapper 634 then outputs the perturbed normal N' to lighting block 640. Texture applicator 630 further overloads the lighting equation as described with respect to step 410. In particular, texture applicator 630 sets the terms in the lighting equation as described previously with respect to steps 520–560.

Texture applicator 630 in the first pass outputs the terms for the overloaded lighting equation to lighting block 640. Phong shader 642 then evaluates the overloaded lighting equation using the terms received from texture applicator 630 to generate the reflection vector color $R_c$ as described above with respect to step 420. The reflection vector color $R_c$ can then be stored temporarily in frame buffer 650.

A second pass then begins through rasterizer 604. Texture coordinate generator 620 converts the reflection vector color to environment map texture coordinates as described above with respect to step 570. Environmental mapper 636 then looks up environment map texel(s) based on the texture coordinates as described above with respect to step 580. Environmental mapper 636 then accesses at least one texel in the environment map as described above with respect to step 430 and outputs one or more accessed texels to lighting block 640. Lighting block 640 then performs additional shading, lighting, and/or coloring operations depending on a particular application. Final pixel data can then be output to frame buffer 650 (step 440). Additional passes can be used to combine the resulting image with further underlying geometry. A final image representative of the geometry data bump mapped into an environment map is then output for display on display unit 660.

Figure 7:
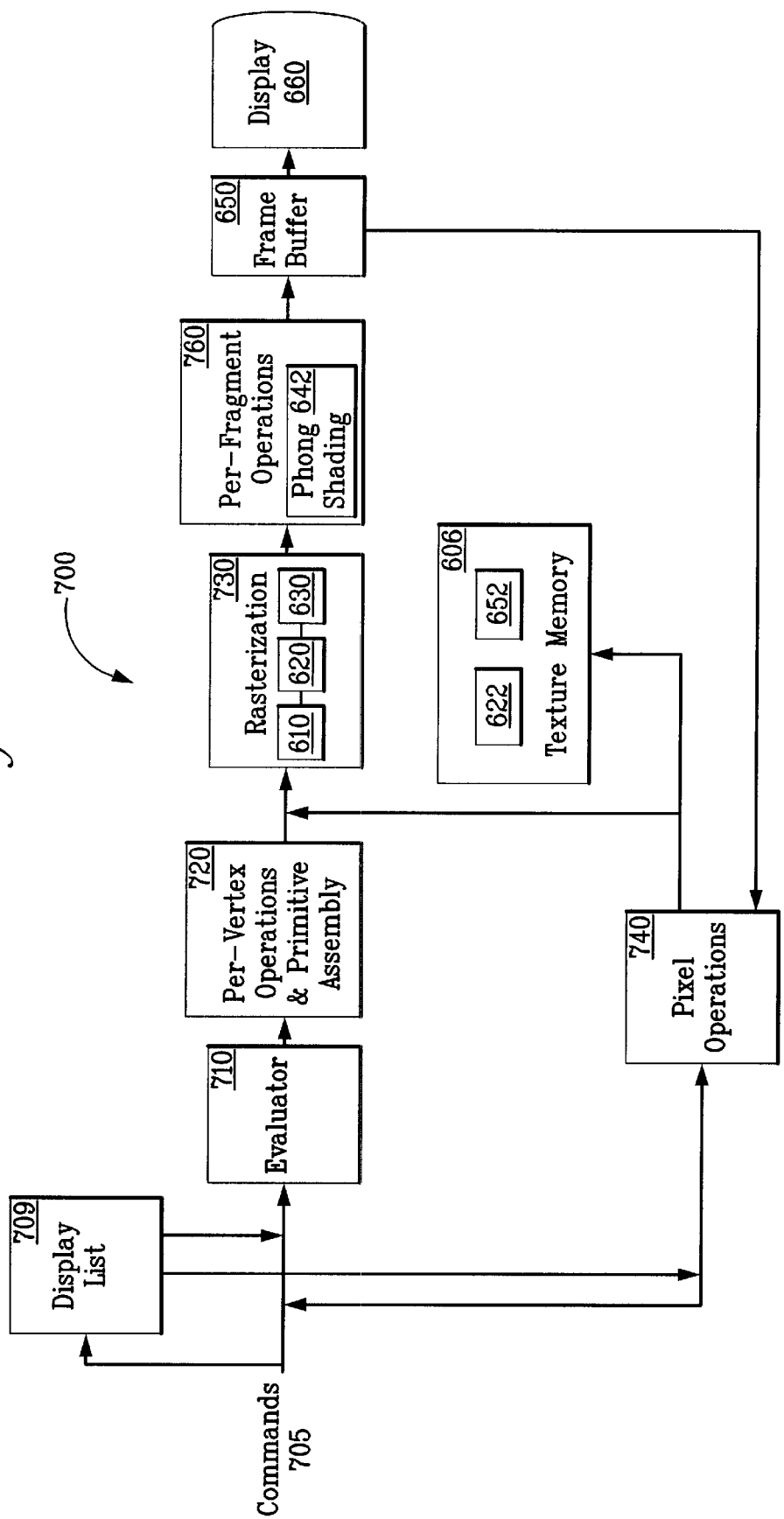
FIG. 7 is a block diagram of an example graphics processing pipeline for bump mapping into an environment map according to one implementation of the present invention written in an example graphics application programming language OpenGL®.

FIG. 7 is a block diagram of an example graphics processing pipeline environment 700 for implementing routine 400 as described above. Graphics processing pipeline 700 can include but is not limited to an OpenGL® operation as described in Beider et al, *OpenGL® Programming Guide, The Official Guide to Learning OpenGL®*, Release 1, Silicon Graphics Inc. (Addison-Wesley Publishing Co., USA, 1993) and *OpenGL® Reference Manual, The Official Reference Document for OpenGL®*, Release 1, Silicon Graphics Inc. (Addison-Wesley Publishing Co., USA, 1992) (both of which are incorporated in their entirety herein by reference).

As shown in FIG. 7, graphics processing pipeline 700 consists of a display list 709, evaluator 710, per-vertex operations and primitive assembly stage 720, rasterization stage 730 (including scan converter 610, texture coordinate generator 620, and texture applicator 630), pixel operations stage 740, texture memory 606, per-fragment operations stage 760 (including Phong Shader 642), frame buffer 650, and a computer graphics display unit 660. Commands 705 (e.g., OpenGL® commands) are input to the graphics processing pipeline 700. Commands 705 specify geometric objects to be drawn and control how the objects are handled during the various processing stages. Commands 705 can be processed immediately through the pipeline 700 or can be accumulated in display list 709 for processing at a later time.

Evaluator 710 approximates curve and surface geometry by evaluating polynomial commands of input values. During the next stage, per-vertex operations and primitive assembly stage 720 processes geometric primitives. Geometric primitives are points, line segments, triangles, and polygons, all of which are described by vertices. Vertices are transformed and lit, and primitives are clipped to a viewport in preparation for the rasterization stage 730.

Rasterization stage 730 produces a series of frame buffer addresses and associated values using a two-dimensional description of a point, line segment, triangle, or polygon. Each fragment produced in rasterization stage 730 is fed into the last stage, per-fragment operations stage 760. Per-fragment operations stage 760 performs the final operations on graphics data before the data stored as pixels in frame buffer 650. These final operations can include conditional updates to the frame buffer 650 based on incoming and previously stored Z values for Z buffering, blending of incoming pixel colors with stored colors, masking, and other logical operations on pixel values.

Input graphics data can be in the form of pixels rather than vertices. For example, an image used in texture mapping is processed in a pixel operation stage 740. Pixel operation stage 740 processes graphics data as pixels and stores a resulting texture map in texture memory 606. Rasterization stage 630 can then use the texture map stored in texture memory 650 for performing texture processing. The output from pixel operations stage 740 can also be applied directly to rasterization stage 730 and merged with resulting fragments into frame buffer 650 just as if the output was generated from geometric data.

In one embodiment of the present invention, the routine 400 for bump mapping into an environment map is implemented in graphics processing pipeline 700 as follows. Texture memory 606 is used to store a bump map 622 and an environment map 652. In Pass One, steps 410 and 420 are performed as per-vertex operations in rasterization stage 730. Pass Two, in steps 430 and 440 are processed on a per-pixel basis in pixel operations stage 740.

C. Example GUI Computer Environment

Figure 8:
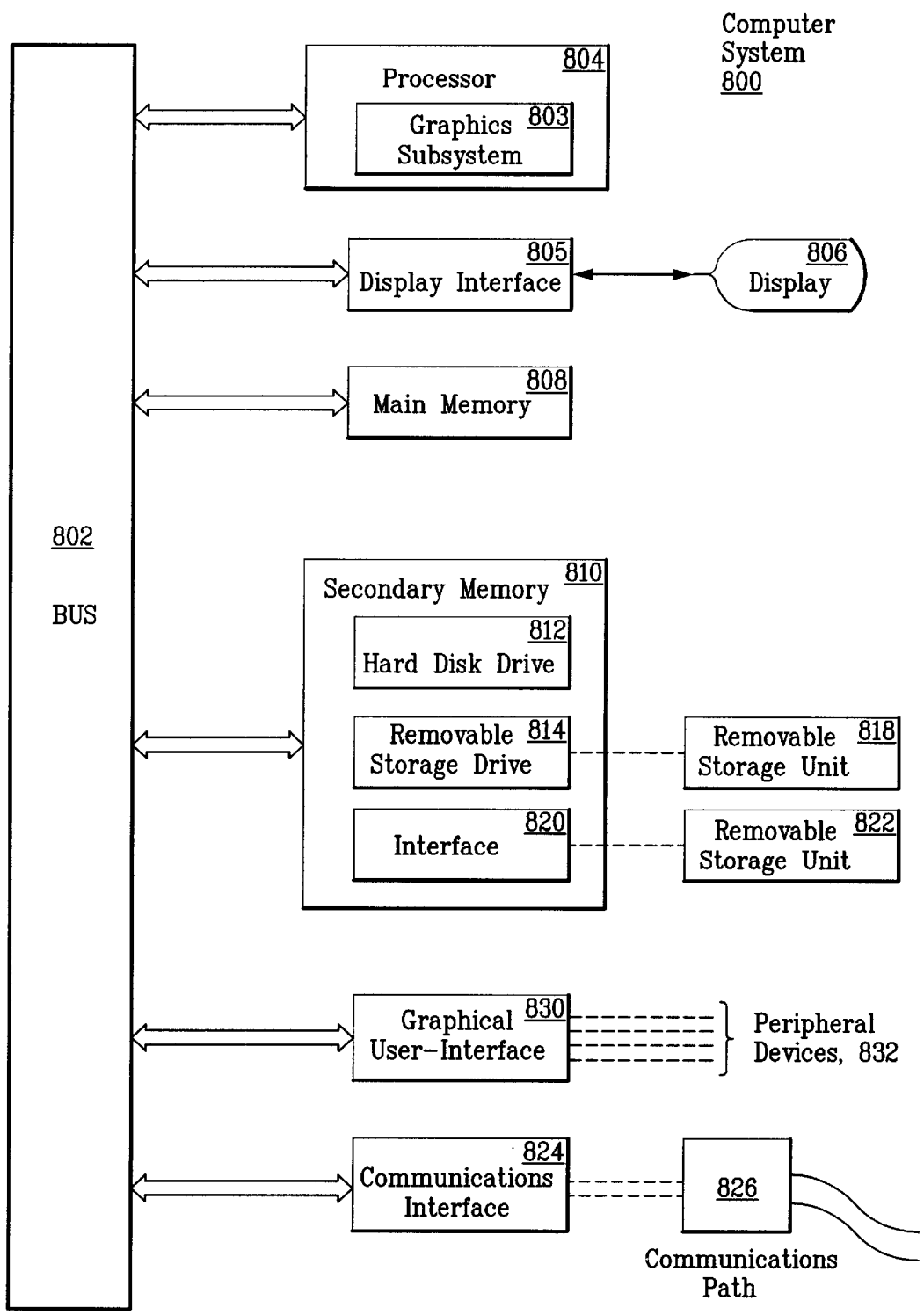
FIG. 8 is an example computer GUI environment according to an implementation of the present invention.

FIG. 8 is a block diagram illustrating an example environment in which the present invention can operate. The environment is a computer system 800 that includes one or more processors, such as processor 804. Computer system 800 can include any type of computer graphics computer, virtual machine, processor (single bus, multiple bus, or bus-less processor(s)), workstation, and network architecture. In one preferred implementation, a machine supporting OpenGL® can be used including, but not limited to, Indigo2™, Indy®, Onyx®, Onyx2™, Infinite Reality®, Infinite Reality2™, or O2® graphics workstations manufactured by Silicon Graphics, Inc.

The processor 804 is connected to a communications infrastructure 802 (e.g., a bus, cross-bar switch, or network). Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 800 includes a graphics subsystem 803. Graphics subsystem 803 can be implemented as one or more processor chips. The graphics subsystem 803 can be included as part of processor 804 as shown in FIG. 8 or as a separate graphics engine or processor. Graphics data is output from the graphics subsystem 803 to the communications infrastructure 802. Display interface 805 forwards graphics data from the communications infrastructure 802 for display on the display unit 806.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EEPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices via communications path 826. Examples of communications interface 824 can include a modem, a network interface (such as Ethernet card), a communications port, etc. Software and data transferred via communications interface 824 are in the form of signals which can be electronic, electromagnetic, optical or other signals capable of being received by communications interface 824, via communications path 826. Note that communications interface 824 provides a means by which computer system 800 can interface to a network such as the Internet.

Graphical user interface module 830 transfers user inputs from peripheral devices 832 to communications infrastructure 802. These peripheral devices 832 can be a mouse, keyboard, touch screen, microphone, joystick, stylus, light pen, voice recognition unit, or any other type of peripheral unit.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

In one embodiment the present invention is implemented using software running (that is, executing) in an environment similar to that described above with respect to FIG. 8. In this document, the term "computer program product" is used to generally refer to removable storage unit 818, a hard disk installed in hard disk drive 812, or a carrier wave, packet stream, or other signal. These computer program products are means for providing software to computer system 800.

Computer programs (also called computer control logic) are stored in main memory and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. Alternatively, the computer program product may be downloaded to computer system 800 over communications path 826. The control logic (software), when executed by the processor 804, causes the processor 804 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

D. Normalized Case

In the above discussion, the vectors N' and V in step 410 were normalized, or unnormalized. For the overloaded lighting equation to be exactly mathematically equivalent to the reflection equation:

$$R = 2N'(N' \cdot V) - V,$$

the viewing vector $\vec{V}$ in the dot-product term (referred to here as "$V_{(1)}$") and the $\vec{V}$ in the subtraction term (referred to here as "$V_{(2)}$") must be equal. In one implementation of step 410, $\vec{V}_{(1)}$ comes from a half angle vector $$\vec{H} = \left( \frac{\vec{L} + \vec{V}}{2} \right),$$

and $\vec{V}_{(2)}$ comes from the ambient material vector $A_m$. Both $\vec{H}$ and $A_m$ are always interpolated across a surface in many graphics hardware implementations. In some hardware implementations, however, $\vec{H}$ is normalized to form $\hat{H}$, which can make $V_{(1)} \neq V_{(2)}$, which will result in visual artifacts for sufficiently large polygons.

In another embodiment of the present invention, an additional pass is used to compute an even more geometrically correct reflection vector by passing the reflection vector through a normal subsystem to be interpolated and normalized prior to the texel accessing pass. In this additional pass, the geometry is re-drawn with a normal pointing away.

As shown in FIG. 9, in the first pass 1A, a normal component sub is set to zero by setting coefficient $a_{cli}$ equal to zero (step 910). Pass 1A is otherwise identical to pass 1. The result of pass 1A is a vector field representing 2N' (N'•$\hat{V}$). Pass 1 B is then performed, in which the -$\hat{V}$ vector is specified as the normal for each vertex in the geometry. In an OpenGL® implementation, functionality (e.g. an opengl normalization command) is then used with additive blending or the lighting environment activated to deposit 2N'(N'•$\hat{V}$)-$\hat{V}$ in the frame buffer (step 930). This need only be a separate pass if the graphics hardware does not support concurrent normalization with lighting. Pass two is performed as described above with respect to steps 570–580 (step 950).

4. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for shading, comprising the steps of:
   overloading a lighting equation to represent a reflection vector as a function of a perturbed normal at a pixel position;
   generating the reflection vector at a pixel position according to the overloaded lighting equation; and
   accessing a texel in an environment map based on the generated reflection vector; whereby, bump mapping and environment mapping effects can be applied in shading on a per-pixel basis in multiple passes through a rasterizer.

2. The method of claim 1, wherein terms in the lighting equation include a specular material vector Sm, a lighting vector L, and an ambient material vector Am; and said overloading step comprises the steps of:
   setting the specular material vector Sm to equal a perturbed normal vector N';
   setting the lighting vector L to equal a viewing vector V at the pixel position; and
   setting an ambient material vector Am to equal the viewing vector V.

3. The method of claim 2, wherein the terms in the lighting equation further include a specular exponent n, two vectors scli and acli, and said overloading step further comprises the steps of:
   setting the specular component n equal one;
   setting the vector scli equal to {2,2,2}; and
   setting the vector acli equal to {−1,−1,−1}.

4. The method of claim 1, wherein said overloading step sets terms in the lighting equation to equal a reflection vector R calculated as follows:

$$R = 2N'(N' \cdot V) - V,$$

where N' is a perturbed normal, and V is a viewing vector at the pixel position.

5. The method of claim 1, wherein said generating step comprises calculating the overloaded lighting equation in hardware.

6. The method of claim 1, wherein said generating step comprises calculating the overloaded lighting equation with Phong shading hardware.

7. The method of claim 1, wherein said overloading step and said generating step are each carried out in a first pass through a graphics pipeline, and said accessing step is carried out in a second pass through the graphics pipeline.

8. The method of claim 1, wherein said overloading step is carried out in a first pass through a rasterizer, and further comprising an additional pass to interpolate and normalize the viewing vector prior to said accessing step.

9. The method of claim 1, wherein said overloading step is carried out in a first pass through a rasterizer that sets an acli term in the lighting equation equal to zero, and further comprising an additional pass to interpolate and normalize the viewing vector.

10. A system for shading, comprising:
    means for overloading a lighting equation to represent a reflection vector as a function of a perturbed normal at a pixel position;
    means for generating the reflection vector at a pixel position according to the overloaded lighting equation; and
    means for accessing a texel in an environment map based on the generated reflection vector; whereby, bump mapping and environment mapping effects can be applied in shading on a per-pixel basis in multiple passes through a rasterizer.

11. The system of claim 10, wherein said overloading means comprises means for setting terms in the lighting equation to equal a reflection vector R calculated as follows:

$$R = 2N'(N' \cdot V) - V,$$

where N' is a perturbed normal, and V is a viewing vector at the pixel position.

12. The system of claim 10, wherein said generating means comprises first hardware that calculates the overloaded lighting equation.

13. The system of claim 12, wherein said first hardware comprises a Phong shader.

14. A graphics subsystem, comprising:
    a texture coordinate generator that generates bump map coordinates and reflection coordinates;
    a texture applicator comprising a bump mapper and an environment mapper;
    a lighting block; and
    texture memory that stores a bump map and an environment map;
    wherein, for fragments being rasterized,
    in a first pass,
    said texture coordinate generator generates bump map coordinates based on vertex information provided in fragments,
    said bump mapper fetches a perturbed normal from said bump map according to said generated bump map coordinates and outputs said perturbed normal to said lighting block,
    said texture applicator outputs terms for an overloaded lighting equation to said lighting block, and
    said lighting block evaluates the overloaded lighting equation using the terms received from texture applicator to generate a reflection vector color; and
    in a second pass,
    said texture coordinate generator converts said generated reflection vector color to environment map texture coordinates,
    said environmental mapper then accesses at least one environment map texel based on said environment map texture coordinates and outputs one or more accessed texels, whereby, a final image having a texture based on said output texels can be output for display.

15. The system of claim 14, wherein said texture applicator outputs terms in the overloaded lighting equation to equal a reflection vector R calculated as follows:

$$R = 2N'(N' \cdot V) - V,$$

where N' is a perturbed normal, and V is a viewing vector at the pixel position.

16. The system of claim 15, wherein said lighting block includes a Phong shader.

17. A computer program product comprising a computer useable medium having computer program logic recorded thereon for enabling a host processor to control a graphics subsystem to perform multi-pass bump mapping into an environment map, said computer program logic comprising:

means that enables the host processor to control the graphics subsystem to overload a lighting equation to represent a reflection vector as a function of a perturbed normal at a pixel position;

means that enables the host processor to control the graphics subsystem to generate the reflection vector at a pixel position according to the overloaded lighting equation; and means that enables the host processor to control the graphics subsystem to access at least one texel in an environment map based on the generated reflection vector; whereby, bump mapping and environment mapping effects can be applied in shading on a per-pixel basis.

\* \* \* \* \*